Dec. 4, 1945.   R. J. ROBERTS   2,390,328
DIRECTIONAL SEISMOGRAPH PICK-UP
Filed June 25, 1943
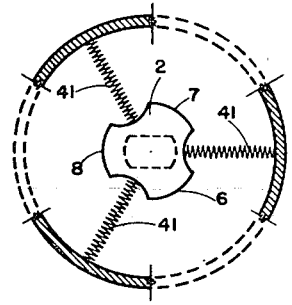
FIG. 4.
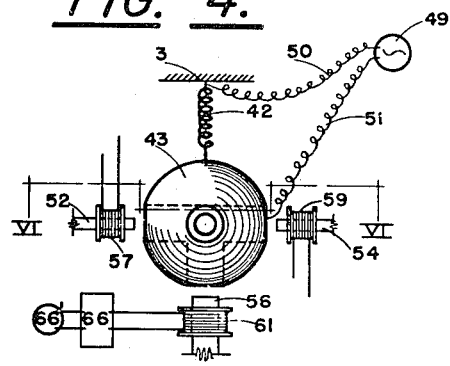
FIG. 5.
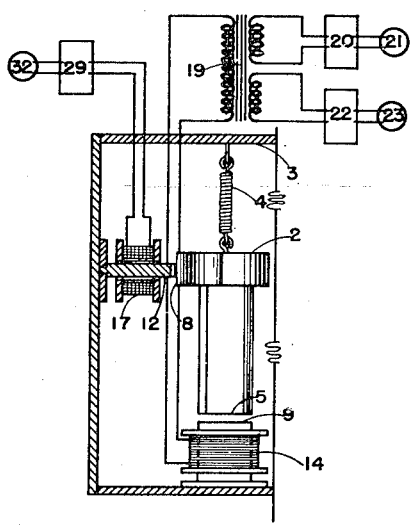
FIG. 2.
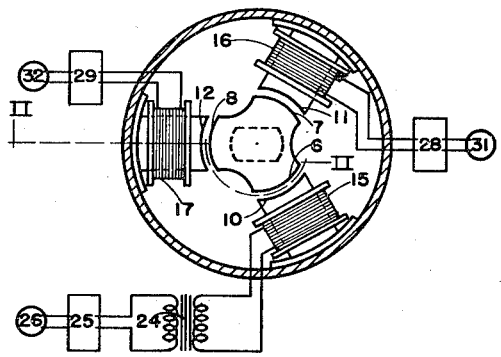
FIG. 1.
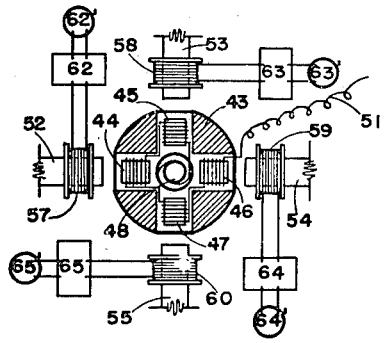
FIG. 6.
FIG. 7.
FIG. 3.
Robert J. Roberts INVENTOR.
BY
J. D. McKean
ATTORNEY.

Patented Dec. 4, 1945

2,390,328

UNITED STATES PATENT OFFICE 2,390,328

DIRECTIONAL SEISMOGRAPH PICKUP

Robert J. Roberts, Houston, Tex., assignor to Standard Oil Development Company, a corporation of Delaware Application June 25, 1943, Serial No. 492,337

10 Claims. (Cl. 177—352)

This invention is directed to seismic pickups in particular, and to seismographs in general.

Seismographs, principally of mechanical types, have been used in the observation of natural earthquakes for about 100 years. Since about the year 1924, seismic methods of prospecting have been used in the exploration for oil. The first seismographs used in this work were of the mechanical type; electrical types were soon introduced and are used, substantially exclusively, at the present time.

Mechanical seismographs consist essentially of a mass of large inertia, suspended by means of a spring from the frame of the instrument, which makes contact with the ground. A pointer, fixed to the mass, is sometimes used to carry a stylus, which produces a record of the earth vibrations on smoked paper, or, when a writing pen is employed, on ordinary paper, fastened to a clock-driven drum in contact with the ground, or with the frame of the instrument. Sometimes, a beam of light is reflected from a mirror fixed to the mass and focused on photographic paper mounted on the clock-driven drum. Mechanical seismographs are intrinsically insensitive unless large masses are employed, and they suffer from the further disadvantage that the record, or seismogram, must necessarily be produced close to the instrument.

In electrical seismographs, it has been customary to employ the principle of induction by suspending a magnet or a coil as the mass and placing in close proximity thereto a coil or a magnet, as the case may be; relative movement between the suspended mass and the fixed element results in the induction of an electromotive force proportional to the velocity of the motion. These electromotive forces may then be amplified to obtain sufficiently large currents to actuate any rugged oscillograph. Light is reflected from the mirrors of these oscillographs, to photographic paper, mounted on clock-driven drums, to produce a seismograph. Sufficient sensitivity for recording, without the use of an amplifier, may be obtained by the utilization of strong magnetic fields and sensitive oscillographs, although at the expense of ruggedness and portability. In other electrical seismographs, one plate of an electric condenser is fastened to the suspended mass and the other plate to the case. Relative motion, between the suspended mass and the case, thus results in variations of the distance between the condenser plates, thus varying the capacity of the condenser; these capacity variations are then recorded. Electrical seismographs, incorporating amplifiers, possess the intrinsic advantage of high sensitivity, coupled with a high degree of portability, because in their construction small masses and stiff suspensions, resulting in high natural frequencies of the instrument, can be used. The loss in sensitivity, due to the small masses and the high natural frequencies, is compensated by the electrical amplifiation of the resulting electromotive forces or variations in condenser capacities. Another advantage results from the fact that the recorder may be placed near to the instrument or at a great distance from it, entirely at the whim of the observer. It is thus possible to employ systems of exceedingly high sensitivity without the disturbing effects due to the presence of an observer, whose heart beat, for example, would show on the seismogram and would constitute a disturbance. Also, it is possible to bury the seismic pickup or to immerse it in water, as, for instance, on the bottoms of lakes or rivers, or it may be forced to a depth of several feet in swamps, while the amplifier and recorder may be placed in a boat or in a truck, depending on whether land or water operations are involved, at any convenient distance from the seismic pickup. In this manner, disturbances occasioned by the wind moving grass, or by insects crawling in the vicinity of, or on, the instrument, or by water waves, may be entirely avoided.

It is usual to define seismograph to mean the whole arrangement, including the vibration-sensitive mass and the recorder. The term "seismic pickup" is used to designate the vibration-sensitive arrangement, not including the amplifier or the recorder. Seismic pickups have been variously designated as geophones, seismometers, detectors, and, erroneously, seismographs.

In the study of the propagation of the seismic waves and in the computation of wave paths and of the depths to elastic discontinuities, which are responsible for the refraction, reflection and diffraction of waves, it is very desirable to know the direction in which the various types of wave arrive at the point of observation. It is obvious, from the laws of propagation of seismic waves, that, for example, the reflection point is not always, or even rarely, vertically below the point bisecting a straight line drawn from the earthquake focus to the point of observation. In the case of refracted waves, the shortest time path from the focus to the point of observation when these two points lie on a straight line approximately parallel to the strike of a dipping formation lies up-dip from said straight line connecting focus and observation point. These examples demonstrate the value of data indicating the direction in which the waves arrive at the point of observation.

It is often desirable to study the frequency spectrum of the seismic waves. It is known that geologically old formations absorb less high frequency energy from the waves than geologically young formations. A study of the frequency content of the waves, therefore, furnishes clues to the age of the formations and often indicates, for example, when most of the energy is carried in a single band of frequencies of not too great width, that prospecting work of sufficient accuracy can be done by incorporating in the equipment electrical filters having a pass band in the same frequency range.

No instrument has been available in the past for the simultaneous recording of several components, arriving in as many directions at the point of observation, of the earthquake waves and of their frequency-amplitude characteristics.

It is the object of the present invention to provide a seismic pickup for the recording of two or more components of the earthquake vibrations, a seismic pickup which will enable, in suitable cooperation with amplifiers and oscillographs, the recording of vibrations due to natural or artificial earthquakes. It is the further object of the present invention to provide for the simultaneous recording of suitable and desired ranges of frequencies of the earthquake vibrations.

The invention is described in the following specification and illustrated in accompanying figures, in which Figure 1 is a plan view partly in section of an embodiment of the present invention, Figure 2 is a view taken along the line II—II of Figure 1, Figure 3 is a fragmentary view of an alternative arrangement of a mass and pickup means suitable for use in an arrangement similar to that shown in Figures 1 and 2, Figure 4 is a fragmentary view of another modification suitable for use in the arrangement shown in Figures 1 and 2, Figure 5 is an elevation partly in section of another embodiment of the present invention, Figure 6 is a view along line VI—VI of Figure 5, and Fig. 7 is a fragmentary view of another modification suitable for use in the arrangement shown in Figs. 5 and 6.

In Figure 1, numeral 2 designates the mass of the pickup, which is suspended from the frame of the instrument 3, by means of the spring 4. It is understood that the frame 3 makes good contact with the earth when the instrument is used, and that, within wide limits, any desired natural frequencies of the vibrating system, consisting of mass 2 and spring 4, can be achieved by the proper adjustment of the mass and of the spring material, the radius and the diameter of the wire of which it is made when a helical spring is employed, or of the length, thickness, width and material when a leaf spring is used. The choice of the natural frequencies of the system is determined by what it is desired to accentuate on the seismogram and by the frequency of disturbing vibrations. It is always desirable, although not always possible, to use a natural frequency far removed from the frequencies of disturbing vibrations, and as near as possible to the frequencies which it is desired to emphasize on the seismogram. In order to prevent deleterious resonance effects, it is necessary to damp the oscillating system at least critically, and it is preferable to overdamp it; such overdamping results in a loss of sensitivity, but it assures approximately the same sensitivity over a wider band of frequencies and serves to accentuate the first onsets of refracted, reflected and diffracted rays arriving at the seismic pickup from the source of the seismic energy, the earthquake focus in the case of natural earthquakes, and the shot, or explosion, point in the case of artificial earthquakes.

In most cases it is preferable that the instrument be substantially as sensitive to seismic vibrations following a vertical path as to seismic vibrations following a horizontal path. This result may be obtained with the helical spring 4 shown in the drawing by the selection of a suitable length and radius of spring and diameter of wire and by selecting a proper mass to be supported by the spring. If the load on the spring is well within the elastic limit of the spring, the instrument will usually be more sensitive to vibrations traveling in a horizontal path than to vibrations traveling in a vertical path. However, by increasing the load on the spring so that its elastic limit is reached or approached, its sensitivity to vibrations traveling in a vertical path becomes much higher. It is generally preferable to load spring 4 sufficiently to approach its elastic limit, the load being adjusted so that the sensitivity of the instrument is the same whether the vibrations received approach from a horizontal or a vertical direction or from an angle between the horizontal and the vertical.

The mass 2 is preferably formed of permanent magnets bent at approximately a 90 degree angle. The magnets are machined at both ends so that they will form smooth surfaces at their faces. Any suitable number of magnets may be combined and arranged to form the faces 6, 7 and 8 at the upper end of the mass, determined by the number of directions in which it is desired to pick up the vibrations, the lower ends of all magnets being combined into the face 5. It is obvious that like poles must be combined to form face 5 thus, if the south poles are used for face 5, faces 6, 7 and 8 will all be north poles. When it is desired to record the vibrations arriving at right angles, only two faces, at an angle of 90 degrees, are required.

Opposite the pole faces of the magnets, constituting mass 2, are mounted the faces of soft iron poles 9, 10, 11 and 12, on each of which a large number of turns of fine copper wire, constituting coils 14, 15, 16 and 17 is wound. The face of each soft iron pole is spaced away from the magnetic pole with which it is paired to define an air gap; the seismic vibrations vary these air gaps and the resulting change in magnetic flux induces electromotive forces in the wire coils 14, 15, 16 and 17. The ends of these coils, such as 14, are connected to the primary winding of transformer 19, having split secondary windings. One of these windings may be connected to an amplifier 20, which is provided with a filter passing a certain desired frequency band. The amplified oscillations are then recorded by means of an oscillograph 21. The other winding may be connected to an amplifier 22, which passes a different frequency band, and the amplified oscillations from amplifier 22 may be recorded by means of oscillograph 23. It is clear that all coils may be arranged as shown in the example of coil 14.

If it is desired to record only one frequency band, the ends of the coils, such as 15, may be connected to the primary winding of transformer 24, having only one secondary winding; this latter winding is connected to an amplifier 25, and the amplified oscillations are recorded by means of an oscillograph 26. It is obvious that the recording and amplifying arrangements of all coils may be arranged as shown with respect to coil 15. In other cases, it may be found desirable to connect the coils, such as 16 and 17, directly to amplifiers 28 and 29, and to record the outputs of the amplifiers by means of oscillographs 31 and 32, to record simultaneously on the same roll of photographic paper, thus producing a composite seismogram.

In operation, the soft iron poles having faces 9, 10, 11 and 12, being attached to the case of the instrument, oscillate with the earth on which the case is located. The mass 2, being suspended by spring 4 from the support 3, which in turn is attached to the earth, does not oscillate with observable amplitude in response to the earth vibrations if the frequencies of the earth vibrations differ radically from the natural frequency of the system composed of mass 2 and spring 4. If the frequencies of the earth vibrations are the same as, or not far removed from, the natural frequency of the system 2—4, the mass 2 will oscillate, but with small or negligible amplitude on account of the inertia of mass 2, unless the earth vibrations of this frequency or frequency range are long sustained. This is rarely the case, and, moreover, the energy in the earth vibrations is rarely sufficient to overcome the damping of the mass 2 and to build up vibrations of appreciable, and therefore harmful, amplitude.

The seismic pickup arrangement shown in Figures 1 and 2 will record the vertical component of the seismic vibrations by variations of the air gap defined by magnet face 5 and soft iron pole face 9 and the horizontal components by variations in the air gaps defined by units 6—10, 7—11 and 8—12. As stated above, more or fewer horizontal components may be recorded by the proper design of mass 2 of the oscillatory equipment.

It is sometimes desirable to increase the sensitivity of a seismic pickup to vibrations arriving at an oblique angle to the surface of the ground. In this case the embodiment shown in Figure 3 may be employed. Figure 3 is a fragmentary view showing a device corresponding to that of Figures 1 and 2, but wherein the suspended mass 2 is provided with faces 40 bent downward, for example, through an angle of 45 degrees thus to increase the sensitivity to vibrations arriving in a direction making an angle of 45 degrees with the horizontal.

Another embodiment of the present invention is shown in Figure 4, wherein helical springs 41 are arranged horizontally to extend from the spaces between pole faces 6, 7 and 8 of mass 2 to the case of the instrument. In order that all components arriving in the various directions perpendicular to the faces 5, 6, 7 and 8 may cause displacement of the various air gaps in the same ratio to the amplitudes of the components, and thus be approximately of equal sensitivity for all components, it is necessary that the vertical and horizontal natural frequencies of the vibrating system, composed of the mass and spring or springs, be substantially the same. In simple systems, such as shown in Figures 1 and 2, the horizontal natural frequency is usually lower than the vertical, and should, therefore, be increased. The arrangement of the horizontal springs of Figure 4 increases the horizontal frequency and allows it to be adjusted to equal the vertical natural frequency.

It is obvious that condenser arrangements may be substituted for the air gaps 5—9, 6—10, 7—11 and 8—12, and the advantages of the invention will be retained.

An alternative arrangement in accordance with the present invention is shown in Figures 5 and 6. In this arrangement the spring-suspended mass may be provided with a coil or coils carrying current to produce a magnetic field or magnetic fields and the pickup means arranged for indicating changes in the width of the air gap between the mass and the individual pickup means.

Turning now specifically to Figures 5 and 6, a helical spring 42 has its upper end secured to frame 3 and its lower end secured to mass 43. Mounted on mass 43 are coils 44, 45, 46, 47 and 48. These coils are electrically connected in series and are supplied with electrical current from source 49 by connections including spring 42 and conductors 50 and 51. The source of electrical current 49 may, of course, provide direct current, in which instance the magnetic field produced is similar to the magnetic field of the devices of Figures 1 to 4. It is at times an advantage, however, to employ alternating current for activating coils 44 to 48 inclusive, and in the drawing the source of power has been indicated as alternating current. When alternating current is used to activate the coils mounted on mass 43 it is desirable to employ a frequency different from any expected interfering frequencies. Since 60-cycle current is a common source of disturbances, the source of power should not produce 60-cycle current or a multiple of 60-cycle current, for example 120-cycle. A preferable frequency range is from 100- to 1,000-cycle current, with the exception that multiples of 60-cycle current should be avoided.

It will be observed in the drawing that the axes of coils 44 to 48 are radial with respect to mass 43. Opposite the outwardly extending ends of coils 44 to 48 are mounted soft iron poles 52, 53, 54, 55 and 56, on each of which a large number of turns of fine copper wire constituting coils 57, 58, 59, 60 and 61 is wound. Pickup coils 57 to 61 are connected to amplifiers and oscillographs 62, 62', 63, 63', 64, 64', 65, 65', 66 and 66'. It will be understood, of course, that if desired a transformer may be arranged between each pickup coil and the amplifier.

It will be understood that usually it will be desirable to provide a larger number of activating coils and corresponding pickup coils than is shown in Figures 5 and 6, but for purposes of simplicity only five activating and five pickup coils have been illustrated and described in the drawing. The employment of either larger or smaller numbers of activating and pickup coils in nowise departs from the principle of the device shown.

An advantage of the arrangement of coils activated by alternating current for producing the magnetic field is the indication available to the operator that the pickup means are properly arranged before a seismic signal has been received. The operator may observe the oscillographs connected to the pickup means to determine that the signals picked up by the several oscillographs connected to the single instrument have substantially the same amplitude, indicating that the pickup means is properly leveled and that the mass is centrally arranged with respect to the pickup coils. If the signals produced by the several oscillographs connected to the single instrument are not of approximately the same magnitude, the operator knows that some adjustment must be made in the pickup means before initiating artificial seismic waves. This information is advantageous and is not available when a permanent magnet is used as the source of the magnetic field and no signal is displayed until seismic disturbances are received by the pickup means.

While the oscillographs in the embodiment shown in Figures 5 and 6 have been illustrated as separately mounted, this has been done in order to disclose more clearly the invention. In commercial practice it is preferable to mount the oscillographs together and arranged to record all of the signals simultaneously on the same roll of photographic paper, thus producing a composite seismograph.

It will also be evident that the embodiment of Figures 5 and 6 may have the natural frequency of the vibrating system adjusted by altering the mass of the body, the spring material, the diameter of the wire or the radius of the spring, in the same way as was described in connection with Figures 1 and 2.

Another embodiment of the present invention is shown in Fig. 7 wherein helical springs 66 are arranged horizontally to extend from mass 43 to the case of the instrument. The embodiment of Fig. 7 bears the same relationship to Figs. 5 and 6 that the embodiment of Fig. 4 bears to the embodiment of Figs. 1 and 2. In order that all components arriving in the various directions perpendicular to the faces of coils 44, 45, 46, 47 and 48 may cause displacement of the various air gaps in the same ratio to the amplitudes of the components, it is necessary that the vertical and horizontal natural frequencies of the vibrating system be substantially the same. In a simple system, such as shown in Figs. 5 and 6, the horizontal natural frequency is usually lower than the vertical; the arrangement of horizontal springs 66 of Fig. 7 increases the horizontal frequency and allows it to be adjusted to equal the vertical natural frequency.

Having fully described the present invention, what I desire to claim is:

1. A seismic pickup comprising, in combination, a support, a body, a coil spring suspending the body from said support, means carried by said body arranged for producing a plurality of magnetic fields, with one field having a vertical direction of departure and each remaining field having a horizontal direction of departure and with the direction of departure of each field of said plurality of magnetic fields making an angle with the direction of departure of the remaining fields, and a plurality of pickup coils mounted on said support with each coil adjacent one of said magnetic field sources.

2. A device in accordance with claim 1 in which transversely extending coil springs are secured between the support and the body.

3. A seismic pickup comprising, in combination, a support, a body comprising a plurality of angularly diverging projections with the axis of one projection vertical and the axes of the remaining projections horizontal and with each of said projections forming a magnetic pole, a coil spring suspending said body to said support and a plurality of pickup coils with each coil attached to said support adjacent one of said magnetic poles.

4. A seismic pickup comprising in combination, a support, a body, a coil spring suspending said body from said support, a plurality of coils mounted on said body with the axis of one coil vertical and the axes of the remaining coils horizontal and with the axes of said plurality of coils angularly diverging, a source of power electrically connected to said coils, and pickup coils mounted on said support with each pickup coil adjacent one of the coils mounted on said body.

5. A device in accordance with claim 4 in which the axes of the pickup coils mounted on said support lie on the same line as the axes of the coils mounted on said body.

6. A seismic pickup comprising, in combination, a support, a coil spring, a body suspended from said support by said spring, said body including a longitudinally extending magnetic pole piece and a plurality of transversely extending pole pieces, soft iron cores equal in number to the pole pieces mounted on said support with the axes of said cores lying on the same line as the axes of said pole pieces and defining a relatively narrow gap between the cores and pole pieces, a pickup coil mounted on each iron core and a means for displaying functions of electric energy electrically connected to each of said coils.

7. A device in accordance with claim 6 in which transversely extending springs are secured between said support and said body.

8. A seismic pickup comprising, in combination, a support, a coil spring, a spherical body suspended from said support by said spring and provided with a plurality of radially extending passages, a coil arranged in each radial passage, iron cores equal in number with the coils mounted on said body secured to said support, each core being paired with one of said coils to define a relatively small air gap between said coil and said core, a pickup coil mounted on each core and a separate means for displaying functions of electric energy electrically connected to each pickup coil.

9. A device in accordance with claim 8 in which said suspended body is provided with one vertically extending radial passage and four horizontally extending radial passages and a coil is arranged in each passage with the axes of the coils coinciding with the axes of the passages.

10. A device in accordance with claim 8 in which a plurality of horizontally extending coil springs are arranged between said support and said suspended body and in which one of the passages extends vertically and the remaining passages extend horizontally and the coil arranged in each passage has its axis coinciding with the axis of the passage.

ROBERT J. ROBERTS.